US008944672B2

(12) United States Patent
Wenger et al.

(10) Patent No.: US 8,944,672 B2
(45) Date of Patent: *Feb. 3, 2015

(54) PRECONDITIONER FOR EXTRUSION SYSTEMS

(75) Inventors: Marc Wenger, Sabetha, KS (US); LaVon Wenger, Sabetha, KS (US)

(73) Assignee: Wenger Manufacturing, Inc., Sabetha, KS (US)

( * ) Notice: Subject to any disclaimer, the term of this patent is extended or adjusted under 35 U.S.C. 154(b) by 849 days.

This patent is subject to a terminal disclaimer.

(21) Appl. No.: 12/978,777

(22) Filed: Dec. 27, 2010

(65) Prior Publication Data

US 2012/0052174 A1  Mar. 1, 2012

Related U.S. Application Data

(63) Continuation of application No. 12/871,527, filed on Aug. 30, 2010, now Pat. No. 7,883,263.

(51) Int. Cl.
*B01F 7/04* (2006.01)
*A23K 1/00* (2006.01)
(Continued)

(52) U.S. Cl.
CPC . *B01F 7/04* (2013.01); *A23K 1/002* (2013.01); *A23K 1/003* (2013.01); *A23K 1/004* (2013.01);
(Continued)

(58) Field of Classification Search
CPC ..... B01F 7/00258; B01F 7/04; B01F 7/00125
USPC .............. 366/66, 91, 96–99, 172.2, 290–291, 366/297–301, 323, 325.2, 326.1, 366/327.1–327.3, 329.2; 426/519
See application file for complete search history.

(56) References Cited

U.S. PATENT DOCUMENTS 296,792 A * 4/1884 Smith ......................... 366/327.3
299,766 A * 6/1884 Farmer .......................... 366/149
(Continued)

FOREIGN PATENT DOCUMENTS

DE 4225168 A1 2/1994
EP 0864408 9/1998
(Continued)

OTHER PUBLICATIONS
International Search Report and Written Opinion dated Apr. 9, 2012, in corresponding PCT application No. PCT/US2011/047111; International Filing date Aug. 9, 2009.

*Primary Examiner* — Charles Cooley
(74) *Attorney, Agent, or Firm* — Hovey Williams LLP

(57) ABSTRACT

Improved preconditioners (10) are provided for partial moisturization of human food or animal feed ingredients prior to downstream final processing thereof in an extruder (56) or pellet mill. The preconditioner (10) preferably includes an elongated housing (12) having a wall (14) with an inlet (20) and an opposed outlet (22). The housing (12) also has a larger diameter end wall (16) proximal to the inlet (20), a smaller diameter end wall (18) proximal to outlet (22), and a progressively converging housing wall (14) with a taper angle of from about 2-9°. A shaft (36) extends along the length of housing (14) and supports a plurality of outwardly extending mixing elements (46) positioned in axially and circumferentially spaced relationship along the length of the shaft (36). The outer margins (54) of the mixing elements (46) cooperatively define a taper along the length of the housing wall (14). The shaft (36) is designed to operate at high rotational speeds, and the mixing elements (46) may be selectively angularly oriented to retard or increase the flow rate of materials through the preconditioner (10). The simplified preconditioner (10) is operable to provide high degrees of moisturization and precooking.

23 Claims, 2 Drawing Sheets

(51) Int. Cl.
*A23K 1/18* (2006.01)
*A23N 17/00* (2006.01)
*A23P 1/12* (2006.01)
*B01F 7/00* (2006.01)
*B01F 15/00* (2006.01)

(52) U.S. Cl.
CPC ............ *A23K 1/1853* (2013.01); *A23N 17/005* (2013.01); *A23P 1/12* (2013.01); *B01F 7/001* (2013.01); *B01F 7/00141* (2013.01); *B01F 7/00258* (2013.01); *B01F 15/00824* (2013.01)
USPC ................... 366/172.2; 366/290; 366/325.2; 366/329.2

(56) References Cited

U.S. PATENT DOCUMENTS

| | | | | |
|---|---|---|---|---|
| 431,372 | A * | 7/1890 | Medlin | 366/149 |
| 617,983 | A * | 1/1899 | Dietrich | 366/325.2 |
| 1,411,103 | A * | 3/1922 | Hughes | 366/97 |
| 1,767,102 | A * | 6/1930 | Thorne | 366/297 |
| 2,029,690 | A * | 2/1936 | Wilson | 366/307 |
| 2,029,691 | A * | 2/1936 | Robinson | 196/14.52 |
| 2,087,492 | A * | 7/1937 | Williams | 241/41 |
| 2,278,051 | A * | 3/1942 | Ambrose | 366/303 |
| 2,400,202 | A * | 5/1946 | Kelderhouse | 366/181.1 |
| 3,090,606 | A * | 5/1963 | Burnet | 366/326.1 |
| 3,229,002 | A * | 1/1966 | Feder | 264/15 |
| 3,249,342 | A * | 5/1966 | Mikkelsen | 241/98 |
| 3,332,368 | A * | 7/1967 | Stickelber | 165/299 |
| 3,334,873 | A * | 8/1967 | Stickelber | 366/91 |
| 3,591,146 | A * | 7/1971 | Sutter | 366/75 |
| 3,664,096 | A * | 5/1972 | LeJeune | 55/466 |
| 3,719,506 | A * | 3/1973 | Ehrgott | 99/275 |
| 3,901,482 | A * | 8/1975 | Kieffaber | 366/85 |
| 3,969,314 | A * | 7/1976 | Grigull | 524/425 |
| 4,055,673 | A * | 10/1977 | Mueller et al. | 426/231 |
| 4,108,385 | A | 8/1978 | Funk | |
| 4,171,165 | A * | 10/1979 | Card | 366/186 |
| 4,173,419 | A * | 11/1979 | Blok | 366/228 |
| 4,322,169 | A | 3/1982 | Wood | |
| 4,346,652 | A | 8/1982 | de Ruyter | |
| 4,390,285 | A | 6/1983 | Durr et al. | |
| 4,478,519 | A | 10/1984 | Guibert | |
| 4,650,343 | A * | 3/1987 | Doom et al. | 366/279 |
| 4,723,849 | A * | 2/1988 | Boring | 366/285 |
| 4,752,139 | A * | 6/1988 | Hauck | 366/298 |
| 4,989,504 | A * | 2/1991 | Jay | 99/455 |
| 5,161,888 | A * | 11/1992 | Hauck | 366/299 |
| 5,460,448 | A * | 10/1995 | Woolsey | 366/301 |
| 6,129,010 | A | 10/2000 | Hurd et al. | |
| 6,247,394 | B1 * | 6/2001 | Huber et al. | 99/352 |
| 6,299,342 | B2 * | 10/2001 | Eggen et al. | 366/81 |
| 6,340,487 | B1 * | 1/2002 | Wenger et al. | 426/231 |
| 6,349,570 | B1 | 2/2002 | Coates et al. | |
| 6,387,429 | B1 * | 5/2002 | Huber et al. | 426/516 |
| 6,465,029 | B2 * | 10/2002 | Wenger et al. | 426/231 |
| 6,482,453 | B2 * | 11/2002 | Wenger et al. | 426/231 |
| 6,609,819 | B2 | 8/2003 | Hauck et al. | |
| 6,648,501 | B2 | 11/2003 | Huber et al. | |
| 6,688,217 | B2 * | 2/2004 | Hauck et al. | 100/117 |
| 6,719,448 | B2 | 4/2004 | Tedman et al. | |
| 7,178,973 | B2 * | 2/2007 | Boffard et al. | 366/88 |
| 7,320,583 | B2 | 1/2008 | Bortone et al. | |
| 7,331,702 | B2 | 2/2008 | Taniguchi | |
| 7,448,795 | B2 * | 11/2008 | Wenger et al. | 366/301 |
| 7,458,716 | B2 * | 12/2008 | Kato | 366/329.2 |
| 7,521,076 | B1 * | 4/2009 | Wenger et al. | 426/510 |
| 7,635,217 | B2 * | 12/2009 | Rokey et al. | 366/80 |
| 7,674,492 | B2 * | 3/2010 | Wenger et al. | 426/578 |
| 7,794,134 | B1 * | 9/2010 | Henry | 366/138 |
| 7,883,263 | B1 * | 2/2011 | Wenger et al. | 366/172.2 |
| 7,906,166 | B2 * | 3/2011 | Wenger et al. | 426/461 |
| 7,963,214 | B1 * | 6/2011 | Wenger et al. | 99/348 |
| 8,153,178 | B2 * | 4/2012 | Roden et al. | 426/474 |
| 8,177,414 | B1 * | 5/2012 | Wenger | 366/155.2 |
| 8,858,065 | B1 * | 10/2014 | VanDalsem et al. | 366/158.5 |
| 2003/0112698 | A1 * | 6/2003 | Hauck et al. | 366/85 |
| 2008/0094939 | A1 * | 4/2008 | Wenger et al. | 366/301 |
| 2008/0095910 | A1 * | 4/2008 | Wenger et al. | 426/557 |
| 2009/0175119 | A1 * | 7/2009 | Wenger | 366/132 |
| 2009/0297664 | A1 | 12/2009 | Forte et al. | |
| 2011/0262609 | A1 * | 10/2011 | Wenger et al. | 426/513 |
| 2012/0052174 | A1 * | 3/2012 | Wenger et al. | 426/510 |
| 2012/0123022 | A1 * | 5/2012 | Berns et al. | 523/322 |
| 2012/0180529 | A1 * | 7/2012 | Singer | 65/135.3 |

FOREIGN PATENT DOCUMENTS

| | | | | |
|---|---|---|---|---|
| GB | 929023 | | 6/1963 | |
| GB | 2048755 | A * | 12/1980 | B01J 2/10 |
| JP | 8052393 | | 2/1996 | |
| WO | WO 2012144792 | A3 * | 1/2013 | |

* cited by examiner

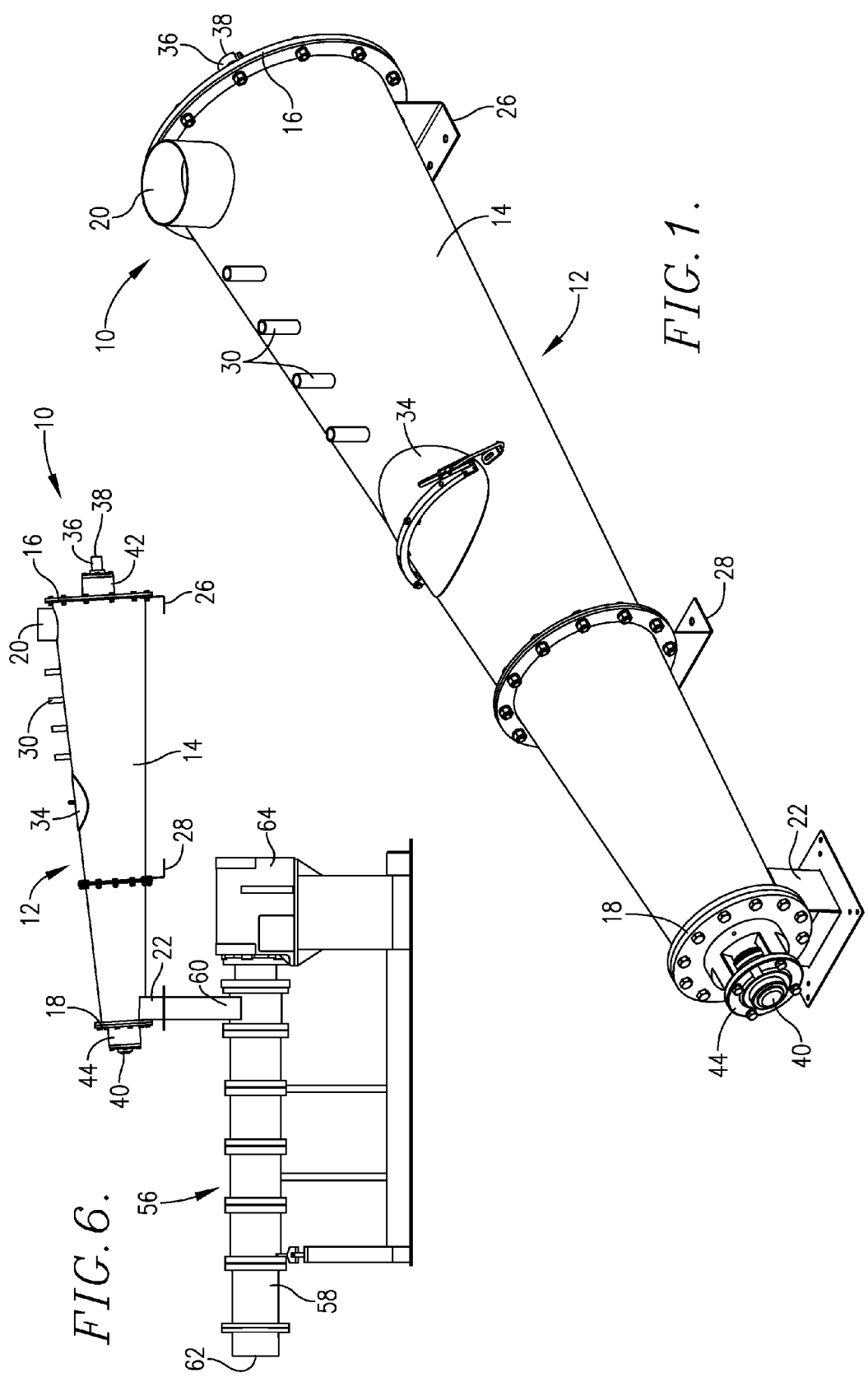

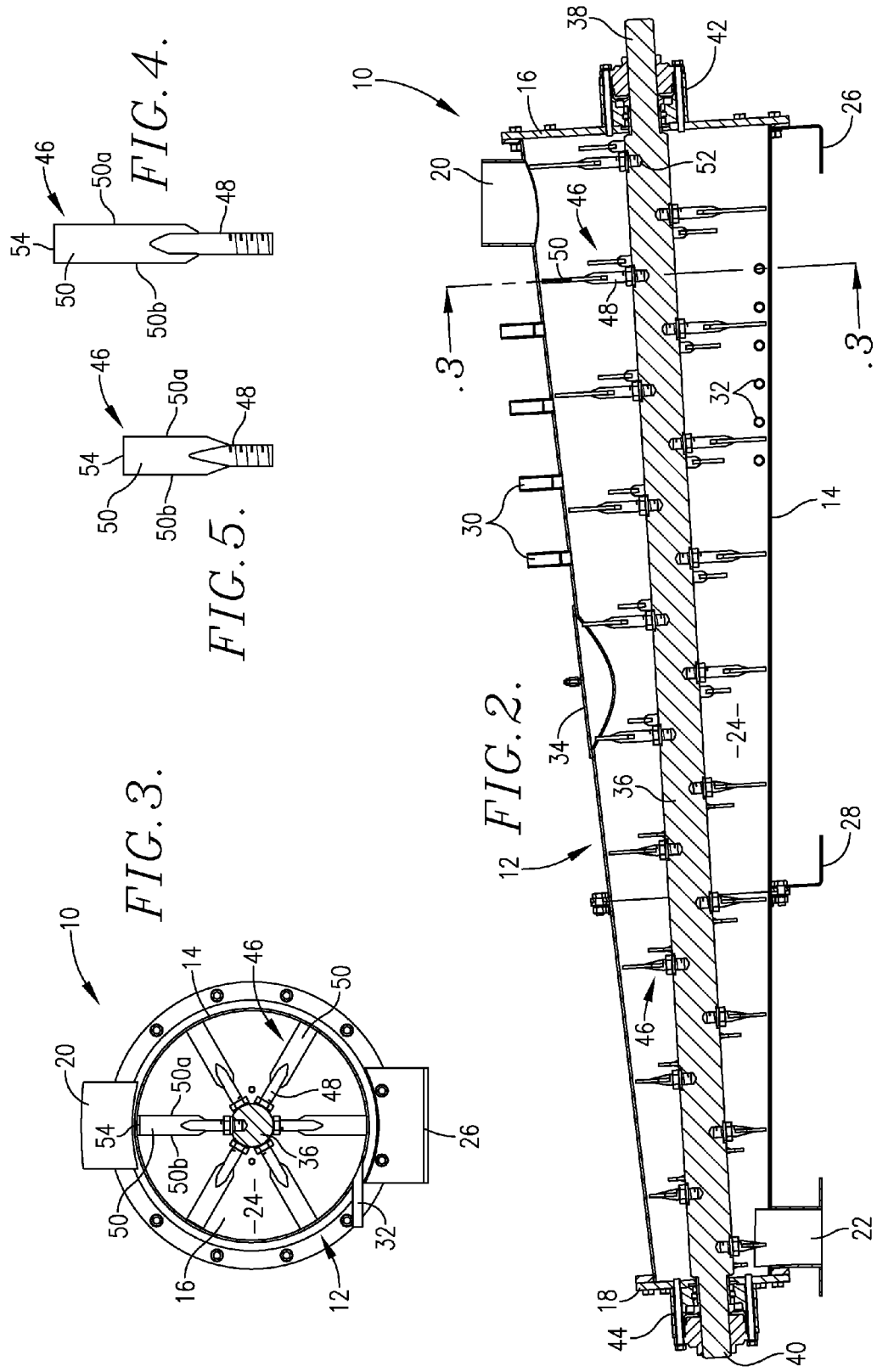

PRECONDITIONER FOR EXTRUSION SYSTEMS

CROSS-REFERENCE TO RELATED APPLICATION

This application is a continuation of U.S. patent application Ser. No. 12/871,527, filed Aug. 30, 2010, which is incorporated herein by reference in its entirety.

BACKGROUND OF THE INVENTION

1. Field of the Invention

The present invention is broadly concerned with preconditioners used in conjunction with downstream processing devices, such as extruders or pellet mills, in order to provide a degree of moisturization and precooking of animal feed or human food ingredients. More particularly, the invention is concerned with such preconditioners, and extrusion systems including the preconditioners, wherein the devices are specially designed to provide adequate moisturization of feed ingredients for use with low-capacity, low-cost extruders.

2. Description of the Prior Art

The majority of feed production systems include a preconditioner serving to moisturize and sometimes partially cook the starting feed ingredients (e.g., respective quantities of protein, fat, and starch such as would be found in pet food ingredients). Such preconditioners are mated with downstream processing devices, such as pellet mills or extruders. Generally, preconditioners of this type are provided with injection ports along the length of the housings for injection of steam and/or water during processing. The combination of energy (both thermal and mechanical) may serve to partially gelatinize the material passing through the preconditioner, measured as the extent of gelatinization of the starch content, but in any event provides needed moisture for facilitating downstream processing The preconditioner art has evolved over a long period of time. One early type of preconditioner, known as a Wenger DC preconditioner, had a pair of side-by-side chambers of equal cross-sectional area with a corresponding shaft within each chamber, and equipped with a plurality of outwardly extending, blade-like beater elements. These types of preconditioners were capable of gelatinizing the starting ingredients to a level of perhaps 20%.

A significant improvement in preconditioners is exemplified in U.S. Pat. No. 4,752,139. These preconditioners, known as Wenger DDCs, had a housing likewise presenting side-by-side chambers, but with one chamber being of greater cross-sectional area than the other. Furthermore, the shafts were operated at different rotational speeds. These types of DDC units were capable of achieving something on the order of 30% gelatinization of the starting materials.

A more recent improvement is found in U.S. Pat. No. 7,674,492. These preconditioners were similar to the DDC models, but each shaft was equipped with a variable speed drive allowing the respective shafts to be adjusted, both in terms of rotational speed and direction of rotation, during operation of the preconditioner. This latest generation of preconditioners is commercialized by Wenger as HIP preconditioners, and these are capable of achieving 50-60% gelatinization.

As can be appreciated, each successive generation of preconditioners has been more sophisticated and more expensive to manufacture. For example, a simple DDC preconditioner would sell for perhaps $60,000, whereas an HIP model could cost around $150,000.

The above-described DDC and HIP preconditioners are generally designed for high-throughput extrusion systems of 10 tons per hour and above. However, entry level extrusion systems are of much lower capacity (e.g., 4 tons per hour). These smaller systems are normally not provided with the aforementioned preconditioners, because the total cost of the system is too great. Accordingly, it has been the custom to use very simple, single shaft blenders in lieu of preconditioners in these low-capacity systems. These blenders, while being relatively inexpensive, do not provide the degree of moisturization and gelatinization required for efficient downstream extrusion. These units are usually below 15% gelatinization, principally owing to the fact that they have very low product retention times. It has been known in the past to equip blenders and low-capacity preconditioners with internal dams or similar structure in an effort to achieve higher retention times. These expedients have met with only limited success, and moreover create areas where product builds up, thus necessitating frequent clean-outs.

There is accordingly a need in the art for an efficient, low-cost preconditioner which can achieve levels of moisturization and gelatinization characteristic of higher capacity preconditioners typically used with more sophisticated feed processing systems.

SUMMARY OF THE INVENTION

The present invention overcomes the problems outlined above and provides a preconditioner operable to moisturize feed materials prior to downstream processing thereof, such as in an extruder or pellet mill. Generally speaking, the preconditioners of the invention include an elongated housing presenting an inlet and an opposed outlet, the housing having a larger diameter end proximal to the inlet and a smaller diameter end proximal to the outlet, with a tapered wall section between the housing ends. At least one elongated, axially rotatable shaft extends along the length of the housing and having a plurality of axially spaced apart, outwardly extending mixing elements supported by the shafts and each presenting an outer margin remote from the shaft(s). The spaced apart outer margins of the mixing elements cooperatively define a taper along the length of the tapered section of the housing.

In preferred forms, the preconditioner is equipped with only a single shaft and the latter is coupled with a drive for rotation of the shaft at speeds of from about 400-900 rpm, more preferably from about 600-850 rpm. Additionally, the housing wall is substantially circular in cross-section and is progressively tapered throughout the length thereof at an angle of from about 2-9°, more preferably from about 4-8°. The housing advantageously has an L/D ratio of from about 3-8, more preferably from about 4-7, with L being the length of the housing between the housing ends, and D being the diameter of the larger diameter end of the housing.

A principal advantage of the preconditioners of the invention is that, owing to the tapered design thereof coupled with outwardly extending mixing elements, substantial residence times are achieved. That is, the preconditioners are operable to retain feed material therein for a time of from about 0.6-4 minutes, more preferably from about 1-3 minutes. In this way, substantial moisturization of the feed ingredients is obtained, preferably at least about 18% by weight, more preferably from about 20-40%, wet basis. In this regard, it is significant that the mixing shaft of the preconditioner is equipped with outwardly extending mixing elements, preferably in the form of beater or paddle-like devices, which are spaced apart along the length of the shaft and are circumferentially spaced about the periphery thereof. This is to be contrasted with tapered extruder devices equipped with a correspondingly tapered, continuous, helically flighted screw. Such devices do not provide the degree of necessary residence time, because they provide a much more positive conveying action, as compared with spaced apart mixing elements.

The invention also provides complete extrusion systems made up of a preconditioner hereof together with an extruder operably coupled with the outlet of the preconditioner and including an elongated barrel having an inlet in communication with the preconditioner outlet, as well as a restricted orifice die outlet spaced from the barrel inlet. At least one elongated, axially rotatable, helically flighted screw assembly is within the barrel and is operable to move preconditioned material from the preconditioner toward and through a restricted orifice die outlet.

BRIEF DESCRIPTION OF THE DRAWINGS

FIG. 1 is a perspective view of a preferred preconditioner in accordance with the invention;

FIG. 2 is a vertical sectional view of the preconditioner illustrated in FIG. 1;

FIG. 3 is a vertical sectional view taken along the line 3-3 of FIG. 2;

FIG. 4 is an elevational view of one of the paddle-type mixing elements of the preconditioner having a relatively long paddle component;

FIG. 5 is an elevational view of another of the paddle-type mixing elements of the preconditioner having a relatively short paddle component; and FIG. 6 is an elevational view of the preconditioner depicted in FIG. 1, operably mounted upstream of a single screw extruder.

DETAILED DESCRIPTION OF THE PREFERRED EMBODIMENT

Turning now to the drawings, a preconditioner 10 in accordance with the invention is illustrated in FIGS. 1-3. The preconditioner 10 broadly includes an elongated, progressively tapered housing 12 having a substantially circular in cross-section housing wall 14, a large diameter end wall 16, and an opposed, smaller diameter end wall 18. The housing wall 14 has a material inlet 20 adjacent wall 16, and a downwardly opening outlet 22 proximal to wall 18. The housing walls thus define a frustoconical internal chamber 24. As illustrated, the housing 12 is supported by L-shaped mounts 26, 28. In order to permit optional injection of steam and/or water into chamber 24, a first series of inlet ports 30 is provided along the top of housing wall 14, and a second series of ports 32 are located in a substantially tangential relationship to the housing wall 14 at the lower portion thereof. A cleanout door 34 is hingedly secured to the top of housing wall 14 and can be opened to facilitate access to chamber 24.

The preconditioner 10 further includes an elongated shaft 36 extending the full length of chamber 24 substantially along the center line thereof. The outboard ends 38 and 40 of the shaft 36 are rotationally supported by bearing structures 42 and 44 respectively supported on the end walls 16 and 18. A drive assembly (not shown) is operably coupled to the end 38 of shaft 36 in order to rotate the latter at relatively high speeds (e.g., 400-900 rpm). Such a drive assembly would typically include a drive motor and gear reduction assembly. Alternately, a variable speed drive may be used in this context, so as to allow infinite adjustment of the speed of rotation of the shaft, as well as controlling the direction of rotation thereof. The outlet 22 includes an elongated tubular body with the longitudinal axis thereof transverse to the axis of the shaft 36.

A plurality of outwardly extending paddle-type mixing elements 46 are secured to shaft 36 along the length thereof. Each mixing element 46 includes a threaded shank 48, as well as a substantially flat paddle section 50 having opposed side margins 50a and 50b and a width greater than the width of the shank 48. As best in seen in FIG. 2, each shank portion is threaded into an appropriate threaded bore 52 in shaft 36, with the paddle section 50 extending substantially radially relative to the longitudinal axis of the shaft 36. Referring to FIG. 3, it will be observed that the elements 46 are both laterally spaced apart along the length of shaft 36, but are also circumferentially spaced about the periphery thereof. Each of the paddle sections 50 has an outermost margin 54, which is located in close adjacency (preferably no more than about one-half inch) to the inner surface of housing wall 14. The axially spaced apart outer margins 54 of the elements 46 cooperatively define a taper which, in preferred forms, is substantially identical with the taper of housing wall 14. In order to achieve this end, the elements 46 have different overall lengths from a point proximal to end wall 16 to the remote end of the shaft 36 proximal to end wall 18. This size difference is illustrated in FIGS. 4 and 5, where it will be seen that both the shank 48 and the paddle section 50 of the comparative mixing elements are of different lengths.

In order to adjust the residence time of material passing through preconditioner 10, the orientation of the respective paddles may be altered. For example, in FIG. 2, all of the elements 46 are oriented in a neutral position relative to the rotation direction of shaft 36 and the longitudinal axis of the shaft (i.e., the paddle sections 50 lie in planes perpendicular to the shaft axis). If it is desired to retard the flow of material through chamber 24, some or all of the mixing elements 46 may be oriented in a negative angular position. For example, if the shaft 36 is rotated in a clockwise direction (see FIG. 3), the flow-retarding mixing elements would be oriented at an angle such that the margin 50a is closer to end wall 16 than the opposite margin 50b, and the planes of the paddle sections 50 would be at an angle relative to the shaft longitudinal axis. The degree of flow retardation would depend upon the number of negatively positioned mixing elements, as well as the angular orientation thereof; usually, this angle is from about 2-20° relative to the longitudinal axis of the shaft.

In like manner, if it is desired to increase the flow rate of the material passing through chamber 24, some or all of the mixing elements 46 may be positioned in a positive flow-increasing position. Such positions would be opposite to the negative positions, and in the example given above, the flow-increasing elements 46 would be angularly oriented so that the margins 50b would be closer to the wall 16 than the corresponding margins 50a, and the paddle section planes would be at an angle relative to the shaft longitudinal axis.

In many cases, it is advisable to have certain numbers of the mixing elements 46 oriented in neutral, forward, and negative positions in order to maximize moisturization and partial cooking of the feed material passing through the preconditioner. The optimum positions of the mixing elements can be found by trial and error.

Referring to FIG. 6, it will be seen that the preconditioner 10 is mounted upstream of a single screw extruder 56. Although not shown, appropriate support structure is provided to support the mounts 26, 28 and thus maintain preconditioner 10 in the illustrated elevated condition. Preferably, the preconditioner 10 is oriented at a slight downward angle from end wall 16 to end wall 18, relative to the horizontal and to the longitudinal axis of extruder 56. This angle is preferably from about 1.5-10°, more preferably from about 2-5°.

The extruder 56 is itself conventional and includes an elongated, multiple-section barrel 58 having an inlet 60 and a restricted orifice die outlet 62. Internally, the extruder 56 has an elongated, helically flighted, axially rotatable screw assembly (not shown) powered by drive unit 64. As depicted in FIG. 6, the preconditioner outlet 22 is coupled with barrel inlet 60 by means of a tubular transition 66.

In operation, human food or animal feed ingredients are delivered to inlet 20 of preconditioner 10, passed through chamber 24, and delivered from outlet 22. During passage of the ingredients, the shaft 36 is rotated and steam and/or water is injected through the ports 30 and 32. The high speed rotation of the shaft 36 causes intense mixing of the ingredients with the water and/or steam in order to moisturize and partially precook the ingredients. Preferably, the degree of moisturization is at least about 18% by weight, and a cook value, as determined by the extent of gelatinization of starch in the ingredients, of from about 15-60%, more preferably from about 20-35%. Normally, the preconditioner 10 operates at substantially atmospheric pressure within chamber 24 and across outlet 22.

The preconditioned ingredients delivered to extruder 56 are subjected to increasing levels of temperature, pressure, and shear within barrel 58, and are then extruded through die plate 62 as finished, fully-cooked food or feed products.

The following example sets forth a series of test runs using a preferred preconditioner in accordance with the invention. It is to be understood, however, that this example is provided by way of illustration only, and nothing therein should be taken as a limitation upon the overall scope of the invention.

EXAMPLE

In this example, a series of test runs was carried out using the preconditioner of FIGS. 1-5, wherein the shaft was equipped with 61 beaters ranging in length from 11.38 inches at the inlet end of the housing to 4.62 inches at the outlet end thereof. The housing wall had a progressive taper of 6.68°. The open area of the housing input was 27.43 sq. in., whereas the area of the output was 45.4 sq. in.

In each test, a pet food recipe was processed, made up of 53% corn, 22% poultry meal, 15% soybean meal, and 10% corn gluten meal (all percentages by weight). The dry recipe was fed to the preconditioner inlet at a predetermined rate, while the shaft was rotated at a selected rpm. Water and steam were injected into the preconditioner housing, and retention times, moisturization, and cook values were measured for each test. the results of this series of runs are set forth below.

TABLE

| Run # | 1 | 2 | 3 |
|---|---|---|---|
| Feed rate (lbs/hr) | 5000 | 5000 | 8000 |
| Motor load (%) | 78 | 88 | 38 |
| Shaft speed (rpm) | 400 forward | 400 forward | 800 forward |
| Discharge temp (F.) | 180 | 200 | 167 |
| Cup temperature (F.) | 176 | 201 | 166 |
| Water (%) | 11.2 | 11.48 | 15.63 |
| Steam (%) | 5.5 | 6.7 | 4.8 |
| Mass weight in cylinder (lbs) | 126 | 130 | 24 |
| Retention time (mins) | 1.36 | 1.59 | 0.17 |
| Moisture (%, wb) | 25.5 | 24.0 | 17.2 |
| Cook (%) | 44.2 | 25.9 | 25.2 |

In Run 1, all of the mixing elements were positioned in a negative 15° orientation. However, the maximum output from this configuration was only 3000 lbs/hr at 500 rpm before overload of the shaft drive motor.

In Run 2, the mixing element configuration was changed so that the first 47 of the elements, beginning at the large diameter end of the housing, were maintained in the negative 15° orientation, while the next 10 elements were oriented in a forward 15° position, and the remaining 4 elements were positioned at a negative 4° position. With this configuration, the preconditioner was able to deliver 5000 lbs/hr of preconditioned material at 400 rpm.

In Run 3, the first 57 mixing elements beginning at the large diameter of the housing were oriented in a forward 15° position, whereas the last 4 elements were in a neutral position. This dramatically lowered the residence time in the preconditioner housing, but did deliver commercially acceptable moisture and cook values.

We claim:

1. A preconditioner operable to moisturize and partially cook a food or feed material prior to downstream processing thereof, said preconditioner comprising:
    an elongated, generally horizontally oriented housing presenting a food or feed material inlet and an opposed preconditioned food or feed material outlet, said housing having a larger diameter end proximal to said inlet and a smaller diameter end proximal to said outlet, and a tapered wall section having a taper angle of from about 2-9° between said housing ends; and
    an elongated, axially rotatable shaft extending along the length of said housing and having a plurality of axially spaced apart, outwardly extending mixing elements supported by the shaft and each presenting an outer margin remote from the shaft,
    the mixing elements along the length of said tapered wall section being of progressively different lengths respectively, between said shaft and said outer margins thereof, with the longest of said mixing elements along the length of the tapered wall section being proximal to said inlet,
    the spaced apart outer margins of said mixing elements cooperatively defining a taper along the length of the tapered section of said housing,
    bearing structure adjacent the end of said shaft proximal to said smaller diameter end of said housing for rotationally supporting the shaft,
    said outlet comprising an elongated tubular body with the longitudinal axis thereof transverse to the rotational axis of said shaft.

2. The preconditioner of claim 1, said taper angle being from about 4-8°.

3. The preconditioner of claim 1, said housing having an L/D ratio of from about 3-8, with L being the length of said housing between said housing ends, and D being the diameter of the larger diameter end of the housing.

4. The preconditioner of claim 1, said preconditioner operable to moisturize said material to a moisture level of from about 15-60% by weight, wet basis.

5. The preconditioner of claim 4, wherein said level is from about 20-40% by weight, wet basis.

6. The preconditioner of claim 1, said preconditioner operable to retain said material therein for a time of from about 0.6-4 minutes.

7. The preconditioner of claim 1, said housing and shaft operable to moisturize said material at substantially atmospheric pressure within said housing and across said outlet.

8. The preconditioner of claim 1, said mixing elements each comprising a shank secured to said shaft and supporting an outwardly extending blade having a width greater than the width of said shank.

9. The preconditioner of claim 1, including a plurality of injection ports operably coupled with said housing and permitting injection of steam and/or water into the interior of the housing.

10. The preconditioner of claim 1, said housing being at a downward angle of from about 1.5-10° relative to the horizontal, with said smaller diameter end below said larger diameter end.

11. The preconditioner of claim 10, said angle being from about 2-5°.

12. The preconditioner of claim 1, said shaft being rotatable at a speed of from about 400-900 rpm.

13. The preconditioner of claim 1, the spaced apart outer margins of said mixing elements being spaced from said housing a distance of no more than about ½ inch.

14. An extrusion system comprising:
a preconditioner operable to moisturize and partially cook a food or feed material prior to downstream processing thereof, said preconditioner comprising:
an elongated, generally horizontally oriented housing presenting a food or feed material inlet and an opposed preconditioned food or feed material outlet, said housing having a larger diameter end proximal to said inlet and a smaller diameter end proximal to said outlet, and a tapered wall section having a taper angle of from about 2-9° between said housing ends; and
an elongated, axially rotatable shaft extending along the length of said housing and having a plurality of axially spaced apart, outwardly extending mixing elements supported by the shaft and each presenting an outer margin remote from the shaft,
the mixing elements along the length of said tapered wall section being of progressively different lengths respectively, between said shaft and said outer margins thereof, with the longest of said mixing elements along the length of the tapered wall section being proximal to said inlet,
the spaced apart outer margins of said mixing elements cooperatively defining a taper along the length of the tapered section of said housing,
bearing structure adjacent the end of said shaft proximal to said smaller diameter end of said housing for rotationally supporting the shaft,
said outlet comprising an elongated tubular body with the longitudinal axis thereof transverse to the rotational axis of said shaft; and
an extruder operably coupled with said preconditioner and including an elongated barrel having an inlet in operative communication with said housing outlet, a restricted orifice die outlet spaced from said inlet, and an elongated, axially rotatable, helically flighted screw assembly within said barrel and operable to move preconditioned material from said preconditioner toward and through said restricted orifice die outlet.

15. The system of claim 14, said housing having an L/D ratio of from about 3-8, with L being the length of said housing between said housing ends, and D being the diameter of the larger diameter end of the housing.

16. The system of claim 14, said preconditioner operable to retain said material therein for a time of from about 0.6-4 minutes.

17. The system of claim 14, said housing presenting a longitudinal axis, said preconditioner oriented with said longitudinal axis being at an angle of from about 1.5-10° relative to horizontal, and with said inlet being higher than said outlet.

18. The system of claim 14, at least certain of said mixing elements comprising a shank secured to said shaft and supporting an outwardly extending blade having a width greater than the width of said shank.

19. The system of claim 14, said housing being at a downward angle of from about 1.5-10° relative to the horizontal, with said smaller diameter end below said larger diameter end.

20. The system of claim 19, said angle being from about 2-5°.

21. The extrusion system of claim 14, said shaft being rotatable at a speed of from about 400-900 rpm.

22. The extrusion system of claim 14, the spaced apart outer margins of said mixing elements being spaced from said housing a distance of no more than about ½ inch.

23. A preconditioner operable to moisturize and partially cook a food or feed material prior to downstream processing thereof, said preconditioner comprising:
an elongated, generally horizontally oriented housing presenting a food or feed material inlet and an opposed preconditioned food or feed material outlet, said housing having a larger diameter end proximal to said inlet and a smaller diameter end proximal to said outlet, and a tapered wall section between said housing ends; and
an elongated, axially rotatable shaft extending along the length of said housing and having a plurality of axially spaced apart, outwardly extending mixing elements supported by the shaft and each presenting an outer margin remote from the shaft,
the mixing elements along the length of said tapered wall section being of progressively different lengths respectively, between said shaft and said outer margins thereof, with the longest of said mixing elements along the length of the tapered wall section being proximal to said inlet,
the spaced apart outer margins of said mixing elements cooperatively defining a taper along the length of the tapered section of said housing,
bearing structure adjacent the end of said shaft proximal to said smaller diameter end of said housing for rotationally supporting the shaft,
said outlet comprising an elongated tubular body with the longitudinal axis thereof transverse to the rotational axis of said shaft.

\* \* \* \* \*